United States Patent Office 2,733,219
Patented Jan. 31, 1956

2,733,219

PREPARATION OF ALUMINA-ALUMINUM HALIDE CATALYSTS

Herman S. Bloch, Chicago, Ill., assignor to Universal Oil Products Company, Chicago, Ill., a corporation of Delaware No Drawing. Application October 17, 1952, Serial No. 315,413

9 Claims. (Cl. 252—442)

This invention relates to the manufacture of catalysts and particularly catalysts comprising alumina and aluminum halide.

In accordance with the present invention aluminum is reacted with water to produce alumina. Before all the aluminum has reacted, the mixture of aluminum and alumina is contacted with a halogenating agent under anhydrous conditions to convert the unreacted aluminum to aluminum halide.

In one embodiment the present invention relates to the process of producing an alumina-aluminum halide composite which comprises reacting aluminum with water in the presence of certain catalytic substances to form alumina and before all of the aluminum has reacted contacting the mixture of aluminum and alumina with a halogenating agent under anhydrous conditions to convert the unreacted aluminum to aluminum halide.

In another embodiment the present invention relates to the process for producing an alumina-aluminum halide composite which comprises reacting aluminum with water in the presence of certain catalytic substances to form alumina, agitating the mixture, and before all of the aluminum has reacted separating the solids from the aqueous medium, drying the solids, and contacting the dried mixture of aluminum and alumina with a halogenating agent to convert the unreacted aluminum to aluminum halide.

In still another embodiment the present invention relates to the process for producing an alumina-aluminum halide composite which comprises reacting aluminum with water in the presence of certain catalytic substances to form alumina, agitating the mixture, maintaining a pressure to keep at least a portion of the water in the liquid phase, and before all of the aluminum has reacted contacting the mixture of aluminum and alumina with a halogenating agent under anhydrous conditions to convert the unreacted aluminum to aluminum halide. Thus in the first step of the process aluminum is reacted with water to produce an alumina-aluminum mixture.

Alumina or aluminum hydrate is present in various modifications, the more common types of alumina being the following:

Alpha-alumina, often known as corundum, is the form stable at temperatures over about 1000° C.

Gamma-alumina is very stable but changes to alpha-alumina at temperatures above about 1000° C.

Epsilon-alumina is the alumina formed in thin films on the surface of metallic aluminum during oxidation by dry or wet air or oxygen.

Gamma-$Al_2O_3 \cdot 3H_2O$ or gibbsite is prepared by ageing boehmite in a cold basic solution.

Alpha-$Al_2O_3 \cdot 3H_2O$ or bayerite is also formed by ageing boehmite in a cold basic solution but is unstable and gradually is transferred into gibbsite.

Gamma-$Al_2O_3 \cdot H_2O$ or boehmite may be prepared in a variety of ways, one of the simplest being to add ammonium hydroxide to a water solution of aluminum chloride. The material originally precipitated is thought to be an amorphous alumina flock which rapidly grows in crystal size yielding crystalline boehmite. Ageing the boehmite in ammonium hydroxide solution transforms the boehmite first to meta-stable bayerite and finally to the stable gibbsite.

Alpha-$Al_2O_3 \cdot H_2O$ or diaspore occurs abundantly in nature.

The gamma modifications are the forms most suitable for use as catalysts and the process of this invention will produce gamma alumina. When practicing the process of this invention a composite is produced in which the aluminum halide is intimately admixed with and adsorbed on the gamma alumina.

It is recognized that the art teaches that alumina is formed on the surface of aluminum upon exposure to dry or wet air or oxygen; but this surface alumina is always referred to as a protective coating of alumina which prevents the aluminum metal under this coating from being converted to the oxide. This step of the process of my invention is such that a substantial amount of aluminum is converted to the oxide and it will be later shown how it is possible to control the amount of aluminum converted to the oxide. In the prior art the protective coating of alumina on aluminum is taught to be of a tenacious nature in that it adheres rigidly to the aluminum metal while in my invention a mixture of gamma alumina and finely divided unreacted aluminum metal is produced. In the preferred embodiment of the first step of my invention, aluminum is converted to the hydrated oxide to the degree desired and it is only necessary to separate water, or if a catalyst is used, water and catalyst therefrom which may be done by appropriate filtering or heating steps.

The aluminum to be used in my process can be any commercially available aluminum, although if a high purity alumina-aluminum halide product is desired it is preferable to start with high purity aluminum. It is also within the scope of this invention to use aluminum alloys; however, since the present process will produce a very pure alumina-aluminum halide composite it is a preferred embodiment of the first step of the present invention to react aluminum of at least 99.5% purity with water to produce a high purity aluminum-alumina product.

The degree of subdivision of the aluminum is a factor determining the rate of the reaction and the uniformity of the final alumina-aluminum halide composite. The smaller the size of the particles the greater is the surface area of aluminum exposed to the water for reaction, the more rapid the reaction with water, and the more uniform the ultimately formed alumina-aluminum halide composition.

Powdered alumina therefore, is a particularly desirable starting material, although aluminum turnings or granulated aluminum may be used. Aluminum pellets prepared by dropping molten aluminum into water have likewise proven to be of a very satisfactory nature for producing the alumina, those pellets below about ½ inch in average diameter being preferred.

The first step of the present invention comprises agitating the aluminum and water and catalytic substances sufficiently so that the reaction to produce alumina proceeds at a desirable rate. The reaction velocity is dependent upon the temperature of the reactants, the degree of subdivision of the aluminum, and the degree of agitation given the mixture. Thus a reaction that proceeds slowly at a temperature of 100° C. with only a mild agitation or shaking of the mixture will proceed very rapidly if the mixture is vigorously agitated. At a temperature of 300° C., on the other hand, the reaction proceeds relatively rapidly even with a mild degree of agitation. However, if the mixture is subjected to vigorous agitation, the time necessary for complete reaction is substantially decreased.

It is a desirable feature of the present invention that liquid water be present in the first step and it is thus necessary when temperatures above the boiling point are employed to effect the reaction under sufficient pressure to maintain a liquid phase of water. The critical temperature of water is 374° C., the definition of the critical temperature being that temperature above which a gas cannot be liquefied by pressure alone. It is desirable to use liquid water since it is much easier to have intimate contact and especially mixing between the aluminum and water accomplished if there is a liquid phase. However, the reaction will also proceed if the water is present in the vapor phase, especially at superatmospheric pressures, and while it is a desired feature to keep water in the liquid phase, it is not at all a limiting feature. Experiments conducted at temperatures near the critical temperature at pressures sufficient to maintain water in the liquid phase have been entirely successful and the reaction proceeds at a very rapid rate. Also, experiments conducted at temperatures near the critical temperature and at pressures insufficient to maintain water in the liquid phase have been entirely successful. From a practical standpoint, the upper temperature can be limited to about 460° C. since temperatures above this cause excessive decomposition of most of the effective nitrogen-base activators or catalysts hereinafter described.

In a specific embodiment the present invention relates to the process for producing an alumina-aluminum halide composite which comprises reacting aluminum with water in the presence of a non-metallic base to form alumina and before all of the aluminum has reacted separating the water and contacting the dried mixture of aluminum and alumina with a halogenating agent to convert the unreacted aluminum to aluminum halide.

A preferred step of the present invention is the reaction of aluminum with water in the presence of ammonium hydroxide or an organic base, such as ethanolamine.

The nitrogen base used in this reaction acts as an accelerant to speed the reaction of aluminum with water in order to form the desired alumina. Where the base used in this process is of such a nature that it might react with or promotes reaction with the walls of the reaction vessel, it is preferred, of course, that the reaction vessel be constructed of material inert to the reactants in order that corrosion and contamination of the products may be avoided.

When ammonium hydroxide or an organic base is used as a catalyst in this reaction, the reaction will proceed at a much lower temperature than if these bases are absent. As an example, if 18 grams of aluminum and 180 grams of water are vigorously stirred at 300° C. under pressure sufficient to maintain water in the liquid phase, the reaction requires approximately four hours for almost complete reaction. If approximately 20 ml. of reagent grade ammonium hydroxide is added to the mixture the reaction requires approximately one hour and 15 minutes to reach 99% completion which is a substantial decrease in the time required for the reaction. The presence of organic bases also catalyzes the reaction. For example, if 18 grams of aluminum and 200 grams of distilled water are placed in a pressure autoclave and the reaction mixture is heated to 80° C., only a small amount of reaction is noticeable within 24 hours; however, if a catalytic amount of ethanolamine is introduced the reaction will have been substantially completed in the same time period. Further, in the presence of the nitrogen bases, aluminum alloys which are inert to the action of water alone even at high temperatures (such as 2S aluminum containing 1% Fe, 0.2% Mn, 0.1% Cu, 0.2% Si, 0.05% Ga, 0.03% Mg, and 0.008% Ti) react readily at relatively mild temperatures.

It is also within the scope of this invention to use the salts of nitrogen bases as catalysts. Thus ethanol-ammonium acetate is a satisfactory salt to use to catalyze this reaction.

Since the base acts as an accelerant or catalyst it is preferably used in very low concentrations. In some cases, there is a range of concentrations in which the base exhibits maximum activity. This optimum concentration of the base can be found in each case by simple experimentation. For example, concentrations of ethanolamine within the range of from about 4% to about 20% have the highest catalytic effect and concentrations lesser or greater than these do not have as great a catalytic effect. Similarly, with n-butylamine maximum reaction velocity leading to substantially complete conversion of the aluminum in a minimum time, occurs with amine concentrations of about 4% to about 23%. Any amount of a base used as an accelerant or catalyst herein mentioned, will be a catalytic amount or referred to as a catalytic amount. The concentration of the catalyst in the water-catalyst solution will usually be within the range of from about 0.05% to about 50% by weight of the aqueous solution.

The catalyst may consist of organic bases such as, for example:

(1) Primary, secondary, and tertiary alkylamines, as for example, ethylamine, diethylamine and triethylamine, butylamine.

(2) Alkyl quaternary ammonium compounds such as tetramethylammonium hydroxide, which may be used at relatively low temperatures to minimize their decomposition.

(3) The alkanolamines, for example the ethanolamines, such as monoethanolamine, diethanolamine and triethanolamine.

(4) Aryl-alkyl amines (primary, secondary and tertiary) such as benzylamine, methylaniline and dimethylaniline.

(5) Pyridine and its homologs, such as the picolines, lutidines and collidines.

(6) Piperidine and its homologs.

In general, I have found that the nitrogenous bases fall roughly into three classes: those having, in aqueous solution, ionization constants equal to or greater than $10^{-5}$ and exhibiting pH values (for 2–25% solutions) above about 12, which are highly active catalysts for dissolving aluminum; those having ionization constants equal to or below about $10^{-9}$ and exhibiting pH values of less than about 11, which are poor catalysts; and those exhibiting intermediate pH values (11 to 12) and having intermediate ionization constants ($10^{-6}$ to $10^{-8}$), which are fair catalysts.

It is my belief, although I do not intend the scope of this invention to be limited by this theory, that the nitrogen bases catalyze the reaction of aluminum with water by continuously dissolving the aluminum oxide film thereby exposing fresh aluminum surface for reaction. It is possible, for example, that the oxide film is removed by the formation of aluminum-nitrogen base complexes which are sufficiently soluble to be carried into the aqueous phase wherein alumina is precipitated from the complex and the nitrogen base regenerated for further use.

It has already been mentioned that it is preferable to use a liquid phase of water and, therefore, the preferred upper limit of temperature that the reaction may proceed at is the critical temperature of water of about 374° C. The reaction requires increasingly longer periods of time as the temperature of the reaction is decreased and where the time of the reaction is not important it is possible to effect the reaction at temperatures down to the freezing point of the water and catalyst solution, that is, about 0° C. or lower, altho the reaction is quite slow at such low temperatures. Thus the feasible temperature range in which the reaction between aluminum and water in the presence of a catalyst is effected is from about 0° C. to about 460° C.

Within the range of temperatures in which the reaction may be effected the alumina-aluminum mixture is produced in various modifications. In the lower range of temperatures, for example, from about 0° C. to about 75° C. the alumina is produced in an extremely finely divided form, that is, the alumina is produced in this form directly without the need of attrition or grinding. To obtain this finely divided alumina, or impalpable powder, directly it is essential that the reaction is effected at relatively low temperatures which necessitate relatively long reaction periods. The preferred upper temperature limit for producing this form is about 75° C. At temperatures above about 75° C. alumina particles will be formed in an increasingly larger average crystalline size. The alumina produced in this lower range of temperature is further characterized as being gibbsite. An analysis of the alumina product formed at 205° C. shows that the product is chiefly gibbsite, however, traces of boehmite, a modification of alumina, are in evidence. As the temperature of the reaction is increased the per cent of boehmite in the product is accordingly increased, and at a temperature of approximately 345° C. the product of the reaction between aluminum and water in the presence of a catalyst is analyzed as being boehmite. As pointed out above, the temperature at which the reaction is carried out also affects the size of the alumina crystals. The reaction between aluminum and water at high temperatures will produce larger crystals which after drying appear to be rough enough to use as an abrasive. The amount of nitrogen base activator present also affects the crystallite size, larger average particle sizes being obtained with higher concentrations of activator.

The reaction may be effected in any suitable type of equipment wherein the reactants are subjected to agitation and preferably to vigorous stirring. The operation may be carried out in continuous or batch-wise fashion. When temperatures above the boiling point of water are employed and the reaction is performed with water in the liquid phase it is, of course, necessary that the reaction vessel be capable of withstanding pressures sufficient to maintain a liquid phase of water. In small scale production of alumina by this process a rotationg pressure autoclave is satisfactory. When the temperatures employed are below the boiling point of water the reaction may be effected in ordinary open equipment, in which a means is provided for vigorous stirring or agitation of the reagents. It is, however, necessary that the process equipment be constructed of materials which are not affected by water or aluminum and/or the catalyst used so that undesirable elements are not introduced into the desired alumina product. However, if the presence of these foreign substances is not objectionable the above precautions need not be adhered to. Hydrogen is produced as a by-product of the reaction and a means of venting must be provided if the pressure build-up caused by the production of this hydrogen is to be avoided. If the equipment will withstand this additional pressure, however, it is not necessary to vent the hydrogen continuously.

By careful control of the variables of time, temperature, degree of agitation, amount of catalyst, and degree of subdivision of the alumina, it is possible to halt the reaction at any particularly desired point. Thus if a mixture of 50% aluminum and 50% alumina is desired before the halogenating step of the process, it is possible by control of these variables accurately to react the aluminum to produce the desired mixture. The effects of the variables of time, temperature, degree of agitation, and degree of subdivision of the aluminum particles have been hereinbefore explained in detail. The effect of the amount of catalyst used, however, may not be as readily apparent and each particular catalyst has its own particular effect on the rate of reaction.

The results of experiments conducted by reactiong aluminum with water by agitating the mixture at 85° C. for 6 hours in the presence of variable amounts of mono-normal-butylamine are shown in Table I.

TABLE I

| Concentration of Normal Butylamine | Percent of Aluminum Reacted |
|---|---|
| 12.2 | 100 |
| 2 | 60.6 |
| 0.5 | 21.1 |

Likewise experiments conducted by reacting aluminum with water at 100° C. for 6 hours in a well-stirred vessel show the following results in Table II.

TABLE II

| Concentration of Ethanolamine | Percent of Aluminum Reacted |
|---|---|
| .25 | 12.8 |
| .5 | 40.6 |
| 1.0 | 69.4 |
| 2.0 | 92.6 |
| 4.0 | 99.6 |
| 6.0 | 99.8 |

As was hereinbefore mentioned, each particular catalyst has its characteristic effect on the rate of reaction and by simple experimentation the time necessary to obtain the amount of reaction desired may be ascertained. The alumina-aluminum mixture formed in the reaction need only be filtered from the water-nitrogen base mixture, water washed and dried ready for the halogenating step. In order that substantially anhydrous aluminum halide may be formed in the halogenating step, the aluminum metal-alumina mixture must be dried prior to halogenation to convert the bulk of the hydrated alumina to anhydrous gamma alumina. At the same time, the drying temperature must not be so high that substantial amounts of alpha alumina, which is non-adsorptive, are formed. When, however, the mixture to be prepared is alumina-aluminum fluoride or alumina admixed with hydrated aluminum chloride or bromide, drying of the aluminum-alumina mixture prior to halogenation is not essential, and the halogenation may, in fact, be effected in the presence of water, with subsequent drying of the halogenated composite. The dried alumina-aluminum mixture may be halogenated by reaction with either a halogen (such as, for example fluoride, chlorine or bromine) or with the corresponding anhydrous hydrogen halides.

In the preferred mode of operation, the mixture of alumina and aluminum is filtered and water washed and dried at a temperature of from about 400° C. and preferably of from about 500° C. to about 700° C. and preferably not over 600° C. to reduce the water content of the mixture to less than about 1.0% by weight and preferably about 0.5% to about 1%. Thereafter the mixture may be formed into granules or pellets of the desired size and shape, especially when the composite is to be used as a catalyst. When heating the alumina-aluminum mixture it is necessary that the heating or drying be accomplished in an inert atmosphere to prevent the conversion by oxidation of the aluminum metal to alumina. Almost any inert atmosphere will prove satisfactory and preferred inert atmospheres are gases such as hydrogen, nitrogen, flue gases containing low amounts of oxygen, etc. The pilling of the mixture may be done either before or after the drying operation, altho, in general, stronger pills are ultimately obtained from the pre-dried material. After the washing and drying operation no foreign metals remain in the alumina-aluminum mixture and, in fact, this is a feature of this method of operation. The nitrogen base is not consumed in the reaction and may be filtered from the alumina-aluminum mixture and may therefore be reused for catalyzing the reaction of further quantities of aluminum with water.

As was previously mentioned, the dry aluminum-alumina pellets are contacted with the halogenating agent, which may be the halogen or anhydrous hydrogen halide, whereby the aluminum metal is converted to an anhydrous aluminum halide which is in turn admixed with and adsorbed on the aluminum oxide base. When using the anhydrous hydrogen halide the ultimate amount of reaction depends directly upon the amount of aluminum remaining after reaction with water, since in the usual range of halogenating temperatures of from about 10° C. to about 260° C., the reaction between the aluminum and the halogen is much more rapid than the reaction between anhydrous gamma alumina and hydrogen halide. When the halogenating agent comprises halogen, the reaction may take place at atmospheric pressure and room temperature. However, elevated temperatures and pressures may be employed. The usual range of halogenating temperature with either the halogen or hydrogen halide is from about 10° C. to about 260° C. and preferably from about 35° C. to about 190° C. and the usual halogenating pressure is from about atmospheric to about 1000 p. s. i. and preferably from about atmospheric to about 100 p. s. i. However, temperatures and pressures greater or lesser than these may be employed within the scope of this invention.

The alumina-aluminum halide composite of the present invention finds particular use as a catalyst, especially as a catalyst in the petroleum industry. Alumina-aluminum chloride catalyst is a particularly effective isomerization catalyst or alkylation catalyst, being suitable for the alkylation of either isoparaffins or aromatic hydrocarbons with olefines, the alkylation of aromatic hydrocarbons with alkyl halides, and the like. The percent by weight of aluminum chloride in the alumina-aluminum chloride isomerization catalyst is from about 1% to about 50% and preferably from about 5% to about 25%. The alumina-aluminum halide catalyst may be used for the isomerization of pure paraffinic compounds or pure naphthenic compounds or the isomerization of a complex mixture of paraffinic and naphthenic compounds. The operating conditions employed in the isomerization process depend to some extent upon the particular concentration of aluminum chloride in the catalyst. In general, however, it will be found that the optimum temperature for most of the isomerization reactions will be within the range of from about 50° C. to about 200° C. The time of contact will vary from a few minutes to several hours. Pressures may range from approximately atmospheric to about 1000 atmospheres, and the presence of a hydrogen chloride activator and/or hydrogen to control side reactions may be advantageous.

The alumina-aluminum halide composite of the present invention also finds particular use in the petroleum industry in hydroforming processes, especially when an alumina-aluminum fluoride composite is further composited with a metal selected from the group consisting of the left hand column of group VI of the periodic table and group VIII of the periodic table. The alumina-aluminum fluoride composite is an effective component to be used for compositing with platinum to prepare a reforming catalyst. The particular reforming catalyst comprising alumina, from about 0.1% to about 3% by weight of fluorine and from about 0.01% to about 1% by weight of platinum is especially effective. The alumina-aluminum halide component of this catalyst is preferably calcined at a temperature of from about 300° C. to about 600° C. before adding the platinum component. The platinum may be added in any suitable manner. A particularly preferred method is to form a separate solution of chloroplatinic acid in water and introduce hydrogen sulfide into the solution at room temperature until the chloroplatinic acid solution reaches a constant coloration; that is, does not change color upon the addition of more hydrogen sulfide. The chloroplatinic acid solution is normally a light yellow and, upon the addition of hydrogen sulfide gas turns to a dark brown color. Apparently the chloroplatinic acid and hydrogen sulfide react to form one or more complex chemical compounds. This chloroplatinic acid solution is mixed with the alumina-aluminum fluoride component in an amount to produce a final catalyst containing from about 0.01% to about 1% by weight of platinum. When the platinum salt is mixed or is commingled with the other components, the mixture is preferably dried at a temperature of from about 100° to about 200° C. for a period of from about 4 to about 24 hours or more, and thereafter subjected to high temperature treatment which usually is a calcination at a temperature of from about 425° C. to about 650° C. for a period of from about 2 to about 8 hours or more. As was previously mentioned this catalyst may be used for the reforming of gasoline or gasoline fractions such as fractions of straight run gasoline and/or thermally cracked gasoline, etc. When reforming a straight run gasoline using the platinum-alumina-aluminum fluoride catalyst, the temperature employed should be within the range of from about 300° C. to about 550° C., the pressure (including hydrogen) within the range of from about 50 to about 100 pounds per square inch, the weight hourly space velocity within the range of from about 0.5 to about 20. The preferred halogens to be used in the process of my invention are fluorine and chlorine, however, bromine may be used when desired and still remain within the scope of this invention. The following examples are introduced to further illustrate the novelty and utility of the present invention but not with the intention of unduly limiting the same.

*Example I*

18 grams of aluminum pellets of 99.9% purity and 200 grams of a 6% solution of ethanolamine were placed in an Ipatieff autoclave of 850 ml. capacity which was fitted with a Pyrex liner. The autoclave was sealed and flushed with nitrogen after which it was heated to 80° C. and the reaction was allowed to proceed for 24 hours at atmospheric pressure. A yield of 99% of gibbsite resulted. The alumina-aluminum mixture therefore was composed of approximately 99% alumina and 1% unreacted aluminum. The powdered mixture, after drying at a temperature of about 550° C. to reduce the water content of 0.5%, is formed into pellets or granules of the desired catalyst shape and the dry pellets are reacted with chlorine at a temperature of 75° C. to effect conversion of the unreacted aluminum to aluminum chloride. The final composite contains about 95% alumina and about 5% of aluminum chloride by weight.

*Example II*

18 grams of aluminum pellets of 99.9+% purity and 200 grams of a 2% solution of ethanolamine were placed in an Ipatieff type autoclave of 850 ml. capacity which was fitted with a Pyrex liner. The autoclave was then sealed and flushed with nitrogen after which it was heated to 100° C. and reaction was allowed to proceed for 6 hours at atmospheric pressure. A yield of 92.6% of gibbsite resulted. Such an aluminum-alumina mixture, after washing and drying in a nitrogen atmosphere at a temperature of 550° C. to reduce the water content to about 0.5%, and pilling, was subjected to the action of anhydrous hydrogen chloride at 100° C. to convert the unreacted aluminum to aluminum chloride. After seven hours, approximately 75% of the aluminum metal had been converted to aluminum chloride which was retained by the alumina, and the catalyst pills showed good strength. This catalyst was a particularly active isomerization catalyst and at 100° C., 170 p. s. i. g. pressure, and a liquid hourly space velocity of 0.5, in the presence of 8 mol percent hydrogen chloride and 2 mol percent hydrogen based on the butane charge, converted n-butane to isobutane to the extent of 65% per pass, with an efficiency of approximately 98%.

*Example III*

18 grams of aluminum pellets of 99.9+% purity and 200 grams of a 12.2% solution of normal butylamine were placed in an Ipatieff type autoclave of 850 ml. capacity which was fitted with a Pyrex liner. The autoclave was then sealed and flushed with nitrogen after which it was heated to 85° C., and the reaction was allowed to proceed for 5 hours at atmospheric pressure. A yield of 99.5% of gibbsite resulted. The aluminum-alumina mixture, after being washed and heated in a nitrogen atmosphere at 575° C. for 12 hours to lower the water content of the mixture to 0.6% and then subjected to the action of hydrogen fluoride to convert the unreacted aluminum to aluminum fluoride, contains 98.5% alumina and 1.5% aluminum fluoride. When this mixture is commingled with a chloroplatinic acid solution to give a final catalyst containing 0.3% platinum and this final catalyst is calcined at 485° C. for 6 hours, an alumina-aluminum fluoride-platinum catalyst is formed which is a particularly effective reforming catalyst and may be used for reforming straight run gasoline. For example, a fraction of straight run gasoline having an initial boiling point of 38° C. and an end boiling point of 205° C., after reforming at a temperature of 485° C., a pressure of 700 pounds per square inch, a weight hourly space velocity of 3.0 and a hydrogen to hydrocarbon mol ratio of 10 is raised from 35 to 82 octane number (A. S. T. M.) clear, with a yield of over 95 volume percent.

I claim as my invention:

1. A process for producing an alumina-aluminum halide composite which comprises reacting aluminum metal with water to form alumina, terminating the reaction before all of the metal has been reacted, separating the resultant mixture of alumina and unreacted aluminum metal from the aqueous medium, drying said mixture and subjecting the same under anhydrous conditions to reaction with a halogenating agent to convert the unreacted metal to aluminum halide.

2. The process of claim 1 further characterized in that said halogenating agent is fluorine.

3. The process of claim 1 further characterized in that said halogenating agent is chlorine.

4. The process of claim 1 further characterized in that said halogenating agent is anhydrous hydrogen chloride.

5. The process of claim 1 further characterized in that said halogenating agent is hydrogen fluoride.

6. The process of claim 1 further characterized in that the aluminum metal is reacted with water in the presence of a catalytic amount of a nitrogen base.

7. The process of claim 1 further characterized in that said mixture is dried at a temperature of from about 400° C. to about 700° C. for a period of from about 2 to about 24 hours.

8. The process of claim 1 further characterized in that the aluminum metal is reacted with water in the presence of a catalytic amount of ammonium hydroxide.

9. The process of claim 1 further characterized in that the aluminum metal is reacted with water in the presence of a catalytic amount of ethanolamine.

References Cited in the file of this patent

UNITED STATES PATENTS

| | | |
|---|---|---|
| 2,328,846 | Pitzer | Sept. 7, 1943 |
| 2,450,394 | Brown et al. | Sept. 28, 1948 |
| 2,582,428 | Haensel | Jan. 15, 1952 |
| 2,623,860 | Haensel | Dec. 30, 1952 |